United States Patent
Lubic et al.

(10) Patent No.: US 12,439,894 B2
(45) Date of Patent: Oct. 14, 2025

(54) LIQUID HUMMINGBIRD FEEDER WITH BASE ASSEMBLY HAVING A TWO-PART NECTAR BASIN WITH RECESSED SEALING MEMBER

(71) Applicant: WOODSTREAM CORPORATION, Lititz, PA (US)

(72) Inventors: Marko K. Lubic, Shillington, PA (US); Luke Benjamin Haney, Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 619 days.

(21) Appl. No.: 16/367,729

(22) Filed: Mar. 28, 2019

(65) Prior Publication Data

US 2019/0320620 A1 Oct. 24, 2019

Related U.S. Application Data

(60) Provisional application No. 62/661,900, filed on Apr. 24, 2018.

(51) Int. Cl.
*A01K 39/02* (2006.01)
*A01K 39/026* (2006.01)
*A01K 39/04* (2006.01)

(52) U.S. Cl.
CPC ........ *A01K 39/0206* (2013.01); *A01K 39/026* (2013.01); *A01K 39/04* (2013.01)

(58) Field of Classification Search
CPC .. A01K 39/02; A01K 39/0206; A01K 39/026; F16J 15/02; F16J 15/108; F16J 15/061
See application file for complete search history.

(56) References Cited

U.S. PATENT DOCUMENTS

| | | | |
|---|---|---|---|
| 4,738,221 A * | 4/1988 | Nock | A01K 39/026 119/52.2 |
| 4,840,143 A * | 6/1989 | Simon | A01K 5/0225 43/131 |
| 4,896,628 A | 1/1990 | Kadunce | |
| 5,303,674 A * | 4/1994 | Hyde, Jr. | A01K 39/00 119/77 |

(Continued)

FOREIGN PATENT DOCUMENTS

| | | |
|---|---|---|
| CA | 2696334 A1 | 9/2010 |
| EP | 0992188 A2 * | 9/1999 |

OTHER PUBLICATIONS

Canadian Examination Report, Application No. 3,040,393, dated Nov. 27, 2023, 5 pages.

*Primary Examiner* — Morgan T Jordan
(74) *Attorney, Agent, or Firm* — Barley Snyder

(57) ABSTRACT

A hummingbird feeder is provided that has a nectar container with a lower end liquid flow opening, a nectar basin positioned below the nectar container and removably coupled thereto, and a recessed elastomeric sealing member. The nectar basin includes an upper part and a lower part that are separable from one another and configured to be engaged along adjacent surfaces thereof. The recessed elastomeric sealing member is held against a retaining structure and is positioned to be engaged between the upper and lower parts of the nectar basin to create a liquid tight seal of the nectar basin when the feeder components are assembled.

19 Claims, 11 Drawing Sheets

(56) References Cited

U.S. PATENT DOCUMENTS

| | | | | |
|---|---|---|---|---|
| 5,454,348 | A | * | 10/1995 | Colwell ............. A01K 39/0206 119/72 |
| 6,659,041 | B1 | * | 12/2003 | Curts ................. A01K 39/0206 119/52.2 |
| 6,779,802 | B2 | * | 8/2004 | Westra ..................... A47L 9/00 277/630 |
| D789,621 | S | * | 6/2017 | Nifong ......................... D30/127 |
| 2005/0028743 | A1 | * | 2/2005 | Wechsler ............. A01K 39/026 119/52.1 |
| 2006/0254527 | A1 | * | 11/2006 | Nock ................... A01K 39/012 119/52.2 |
| 2008/0156269 | A1 | * | 7/2008 | Greenwood ......... A01K 39/012 119/51.01 |
| 2008/0257273 | A1 | * | 10/2008 | Carter ................ A01K 39/0206 119/72 |
| 2010/0192866 | A1 | * | 8/2010 | McMullen ........... A01K 39/026 119/77 |
| 2012/0060762 | A1 | * | 3/2012 | Cowger ............. A01K 39/0206 119/74 |
| 2014/0109836 | A1 | * | 4/2014 | Gauker ............. A01K 39/0206 119/75 |
| 2014/0137804 | A1 | * | 5/2014 | Chen ................. A01K 39/0206 119/72 |
| 2014/0158056 | A1 | * | 6/2014 | Vaughn, Jr. ........ A01K 39/0206 119/72 |
| 2018/0184622 | A1 | * | 7/2018 | Haney ................... A01K 39/04 |

* cited by examiner

LIQUID HUMMINGBIRD FEEDER WITH BASE ASSEMBLY HAVING A TWO-PART NECTAR BASIN WITH RECESSED SEALING MEMBER

This application claims priority from U.S. provisional application Ser. No. 62/661,900, filed Apr. 24, 2018.

BACKGROUND OF THE INVENTION

Field of the Invention

The present invention is related to the field of hummingbird feeders and, more particularly, to an improved base assembly that reduces or eliminates nectar leakage in use.

Description of the Related Art

Hummingbird feeders typically have a base with feeder ports that is connected to a nectar reservoir holding a supply of nectar which is gravity fed into the base as the birds feed through the ports. To facilitate cleaning of the feeder, the base of many hummingbird feeders separates into two parts to allow access to the inner surfaces. The parts are then coupled together for use of the feeder. However, given that nectar is liquid, if the two parts of the base do not seal well against one another, leakage may occur, such as when the feeder is tipped, which is both messy and attractive to bees, ants and other nuisance insects.

Efforts have been made to insert a sealing member between the upper and lower parts of the base by fitting a U-shaped member over the upper edge of the lower part of the base. However, when the base parts are pulled apart, the sealing member can become separated from the lower part, complicating reassembly for the user. The sealing member is also susceptible to uneven placement between the two parts, and twisting or damage to the sealing member itself, particularly after repeated disassembly and assembly of the feeder base.

Accordingly, a need exists for a hummingbird feeder having an improved sealing base assembly.

SUMMARY OF THE INVENTION

In view of the foregoing, the present invention is directed to a hummingbird feeder having a nectar container with a liquid flow opening at a lower end, and a base assembly positioned below the nectar container and removably coupled thereto. The base assembly includes a two-part nectar basin having upper and lower parts that are separable from one another, and a recessed elastomeric sealing member. The upper part of the nectar basin has feed ports therein that are preferably fitted with ornamental features such as artificial flowers. The recessed elastomeric sealing member is positioned within or against a retaining structure that is preferably formed in the lower part, the sealing member being pressed between the retaining structure and the upper part of the nectar basin to create a liquid tight seal of the nectar basin when the feeder is assembled. The elastomeric sealing member may be a separate element or may be overmolded onto, or otherwise connected to, one of the nectar basin parts.

The base assembly of the hummingbird feeder also includes an attaching member associated with the nectar basin that is configured to attach the base assembly to the nectar container when the feeder is assembled. According to a preferred embodiment, the attaching member includes an upwardly extending cylindrical collar with inner threads that receives a threaded bottleneck extension on the lower end of the nectar container that is inserted through an opening in the upper part of the nectar basin. When the nectar container is tightened into the collar, the upper and lower parts of the nectar basin are pressed against one another with the recessed elastomeric sealing member positioned between them and pressed against the retaining structure to seal the nectar basin.

Accordingly, it is an object of the present invention to provide a hummingbird feeder having a nectar container with a liquid flow opening at a lower end, and a base assembly positioned below the nectar container, the base assembly including a nectar basin having an upper part and a lower part separable from one another and meeting along adjacent edges when the feeder is assembled, an attaching member for coupling the base assembly to the nectar container, and a recessed elastomeric sealing member engaged with a retaining structure in the upper or lower part, the upper part being coupled to the lower part with the elastomeric sealing member being positioned along or adjacent the abutting edges of the two parts to provide the nectar basin with a liquid-tight seal when the feeder is in use.

Another object of the present invention is to provide a hummingbird feeder having a base assembly with a sealing member in accordance with the preceding object in which the frictional engagement between the retaining structure and the sealing member holds the sealing member substantially in place during disassembly of the upper and lower parts.

A further object of the present invention is to provide a hummingbird feeder having a base assembly with a sealing member in accordance with at least one of the preceding objects in which the retaining structure includes an overmolding of the sealing member onto the edge of one of the upper and lower parts of the nectar basin.

Yet another object of the present invention is to provide a hummingbird feeder having a base assembly with a sealing member in accordance with at least one of the preceding objects in which the retaining structure is formed on the lower part of the nectar basin and the sealing member is a separate piece received within or held against the retaining structure and positioned between the upper and lower parts of the nectar basin.

Still another object of the present invention is to provide a hummingbird feeder having a base assembly with a sealing member in accordance with the preceding object in which the retaining structure is a groove formed in the perimeter of the lower part of the nectar basin and the recessed sealing member is an O-ring inserted into and held within the groove.

A further object of the present invention is to provide a hummingbird feeder having a base assembly with a sealing member in accordance with the two preceding objects in which the O-ring remains fully attached to the lower part of the nectar basin when the base assembly is disassembled, eliminating the need for user removal and attachment during disassembly and assembly.

A still further object of the present invention is to provide a hummingbird feeder having a base assembly with a sealing member in accordance with at least one of the preceding objects in which coupling of the nectar container to the base assembly presses the upper part of the nectar basin against the lower part of the nectar basin to squeeze the recessed sealing member therebetween.

Yet a further object of the present invention is to provide a hummingbird feeder having a base assembly with a sealing member in accordance with any or all of the preceding objects in which the lower end of the nectar container includes an abutting lower surface and the upper part of the nectar basin includes an abutting upper surface, the attaching member including an upwardly extending cylindrical collar with a top opening into which the lower end of the nectar container is received for threaded engagement within the collar, the sealing member being squeezed between the upper and lower parts to seal the nectar basin when the abutting lower surface of the nectar container is brought into engagement with the abutting upper surface of the nectar basin upper part as the nectar container is tightened into the collar to assemble the feeder.

Another object of the present invention is to provide a hummingbird feeder having a base assembly with a sealing member in accordance with at least one of the preceding objects in which the retaining structure is a perimeter wall on the lower part of the nectar basin, the perimeter wall having a bottom flange that forms a shelf for the recessed sealing member, the sealing member being an annular member that is in elastic contact with the perimeter wall and pressed into abutment with the shelf when the upper and lower parts of the nectar basin are brought together during assembly.

Yet another object of the present invention is to provide a hummingbird feeder with an improved base assembly that is easy to disassemble for cleaning while reliably resealing to prevent nectar leakage when reassembled for use.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
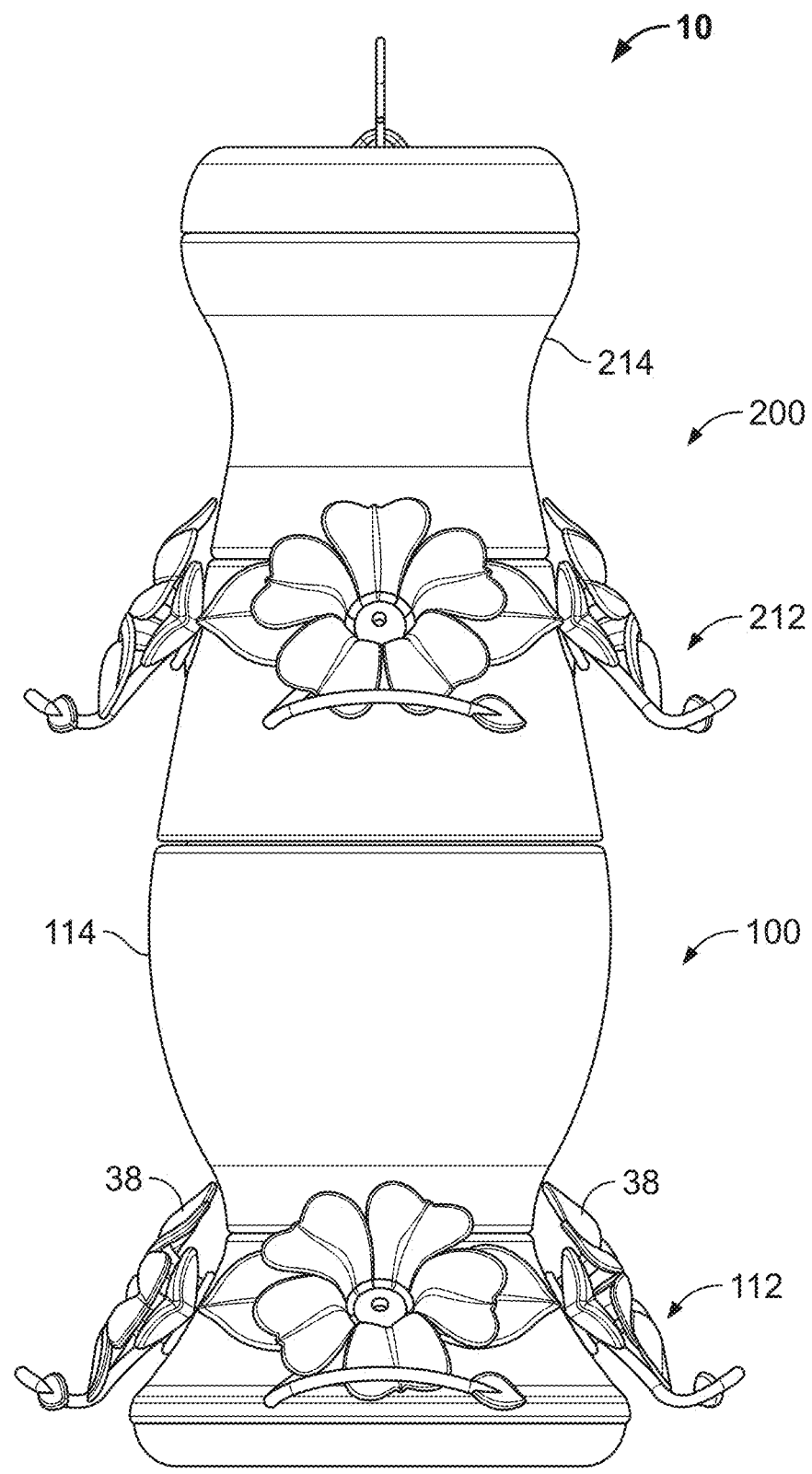
FIG. 1 is a side view of an assembled combination hummingbird feeder having a lower feeder and an upper feeder that can be used separately or snapped together for combined use, each of the lower and upper feeders having a base assembly with a two-part nectar basin and a recessed sealing member in accordance with the present invention.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
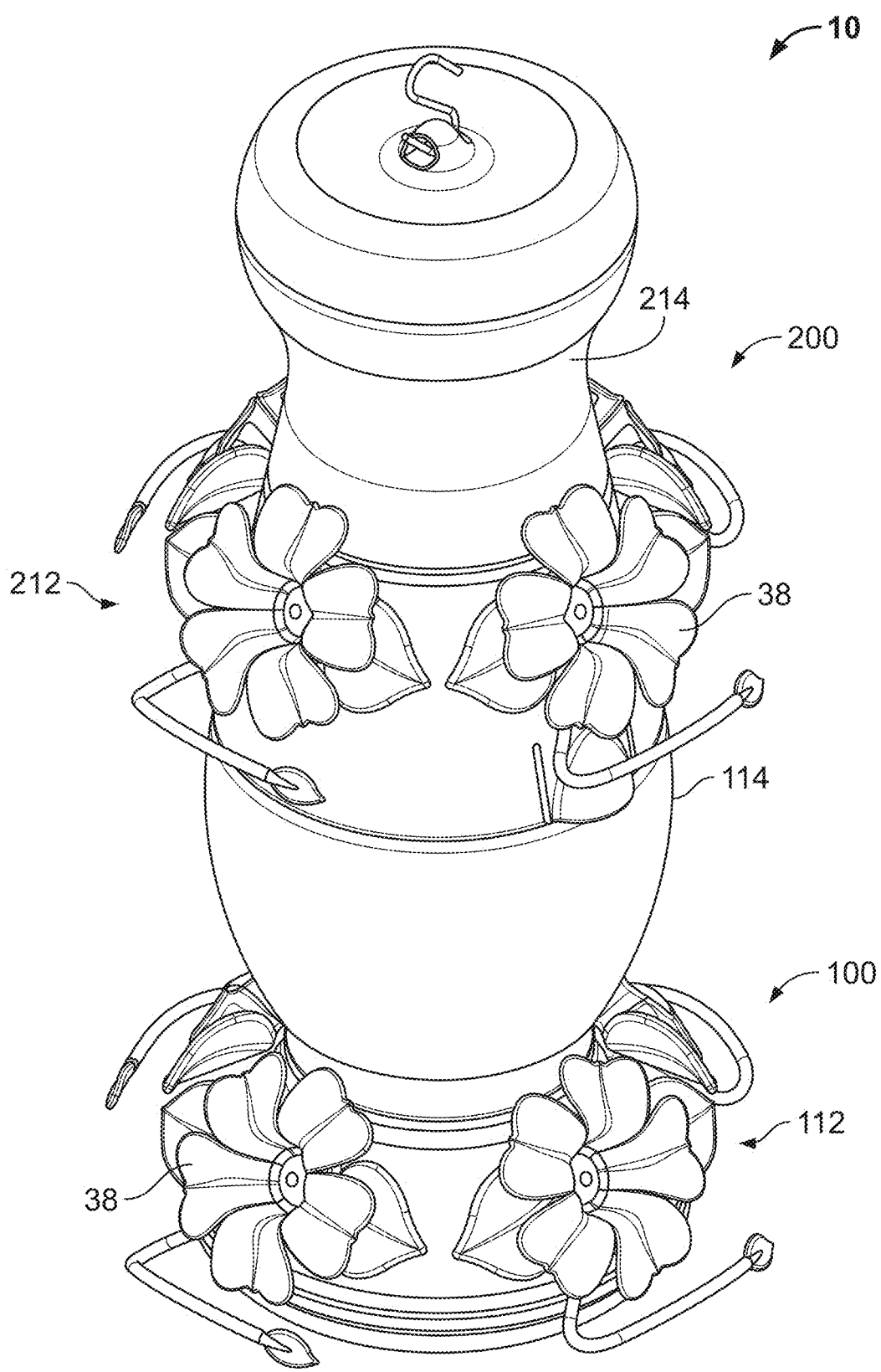
FIG. 2 is a perspective view of the combination hummingbird feeder shown in FIG. 1.
Figure 3:
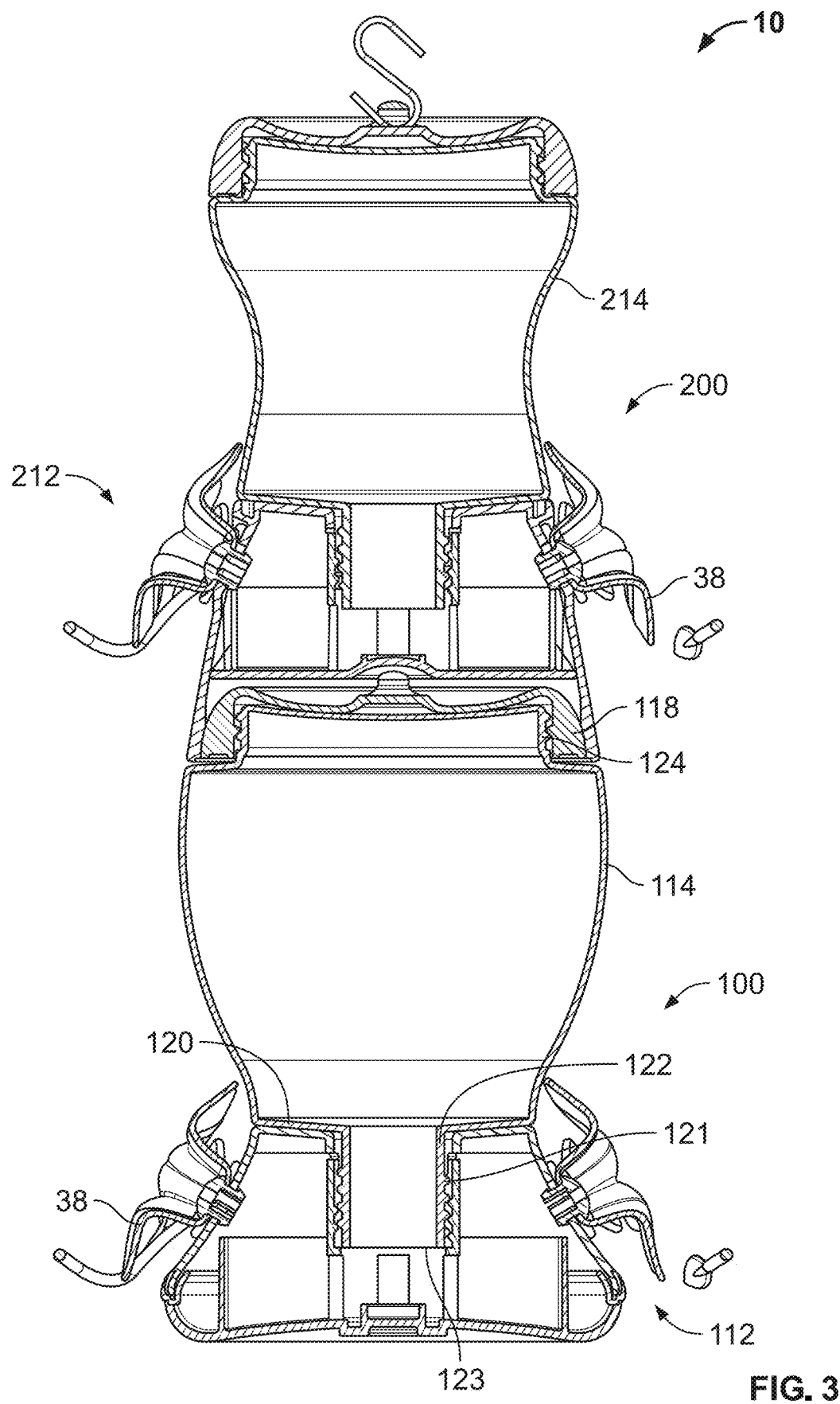
FIG. 3 is a cross section side view of the combination feeder shown in FIG. 1.

As shown in FIGS. 1-3, the present invention is directed to a hummingbird feeder generally designated by reference numeral 10. While the specific hummingbird feeder shown in the drawing Figures herein is a combination feeder separable into two independent feeders, hummingbird feeders having other designs may also incorporate the sealing member configurations to which the present invention is directed. However, use of the combination feeder as a representative platform is expedient in that the two feeders that make up the combination feeder 10 utilize two different base assembly sealing configurations, both of which fall within the scope of the present invention.

Accordingly, the combination hummingbird feeder 10, when assembled as shown in FIGS. 1-3, includes a lower feeder generally designated by reference numeral 100 and an upper feeder generally designated by reference numeral 200. The lower and upper feeders 100, 200 snap together for use as the combination feeder 10 in a manner that is not directly pertinent to the present invention and therefore further description thereof will not be set forth herein.

Figure 4:
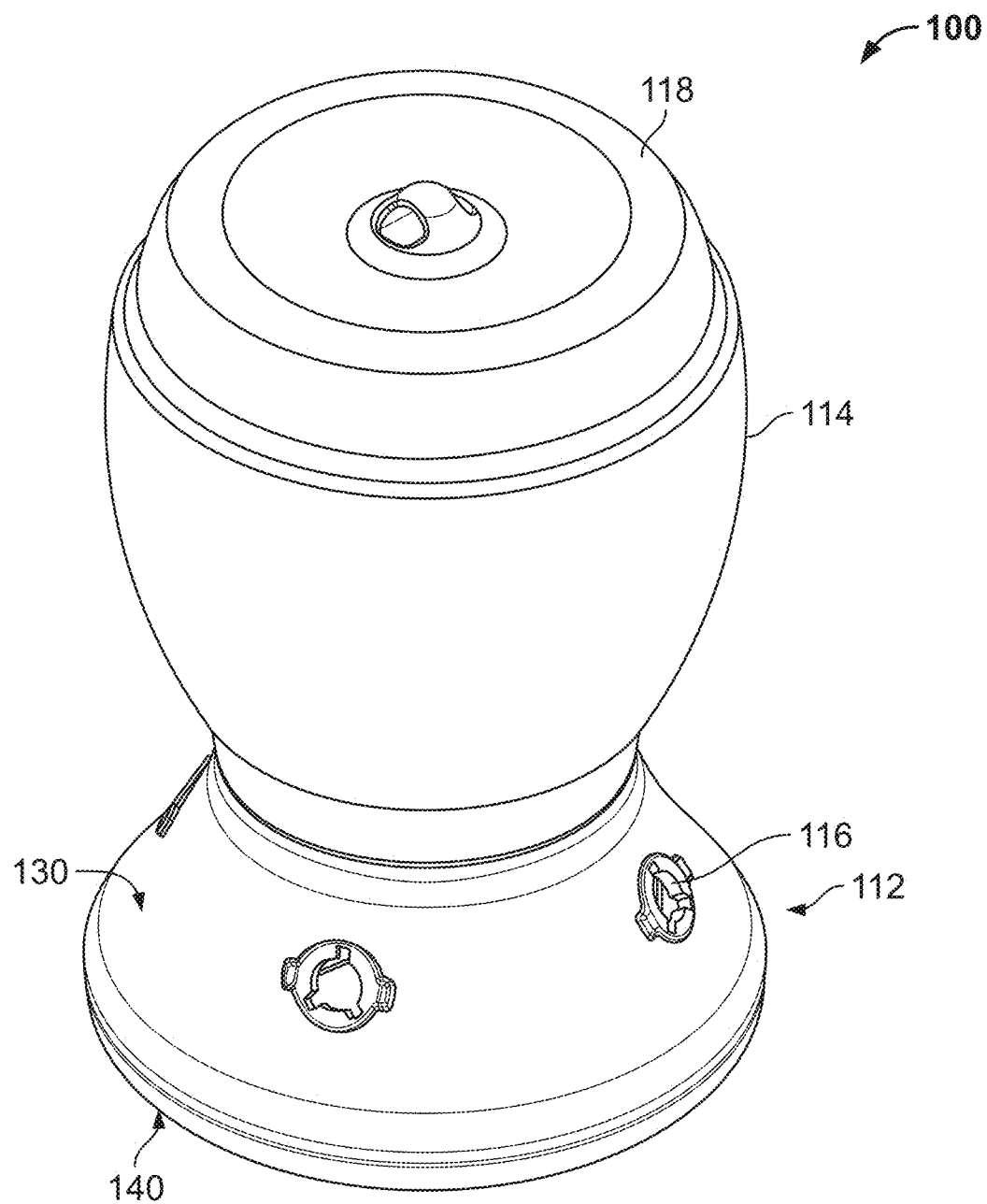
FIG. 4 is a perspective view of the lower feeder shown in FIG. 1 without the flower assemblies.

The lower feeder 100, as separated from the upper feeder 200, is shown in FIG. 4. In this regard, the flower assemblies have been removed as they are not necessary to the description of the present invention set forth herein.

The lower feeder 100 includes a base assembly generally designated by reference numeral 112 and a nectar container 114 positioned above the base assembly 112. The nectar container 114 holds a supply of nectar that is gravity fed into the base assembly 112 as birds draw nectar from the feeder through the feeder ports 116 in the base assembly as is known in the art. The lower feeder is configured to be suspended from a cap 118 which is attached to the upper end of the nectar container. Alternatively, the lower feeder can be coupled to the upper feeder as shown in FIGS. 1-3.

Figure 5:
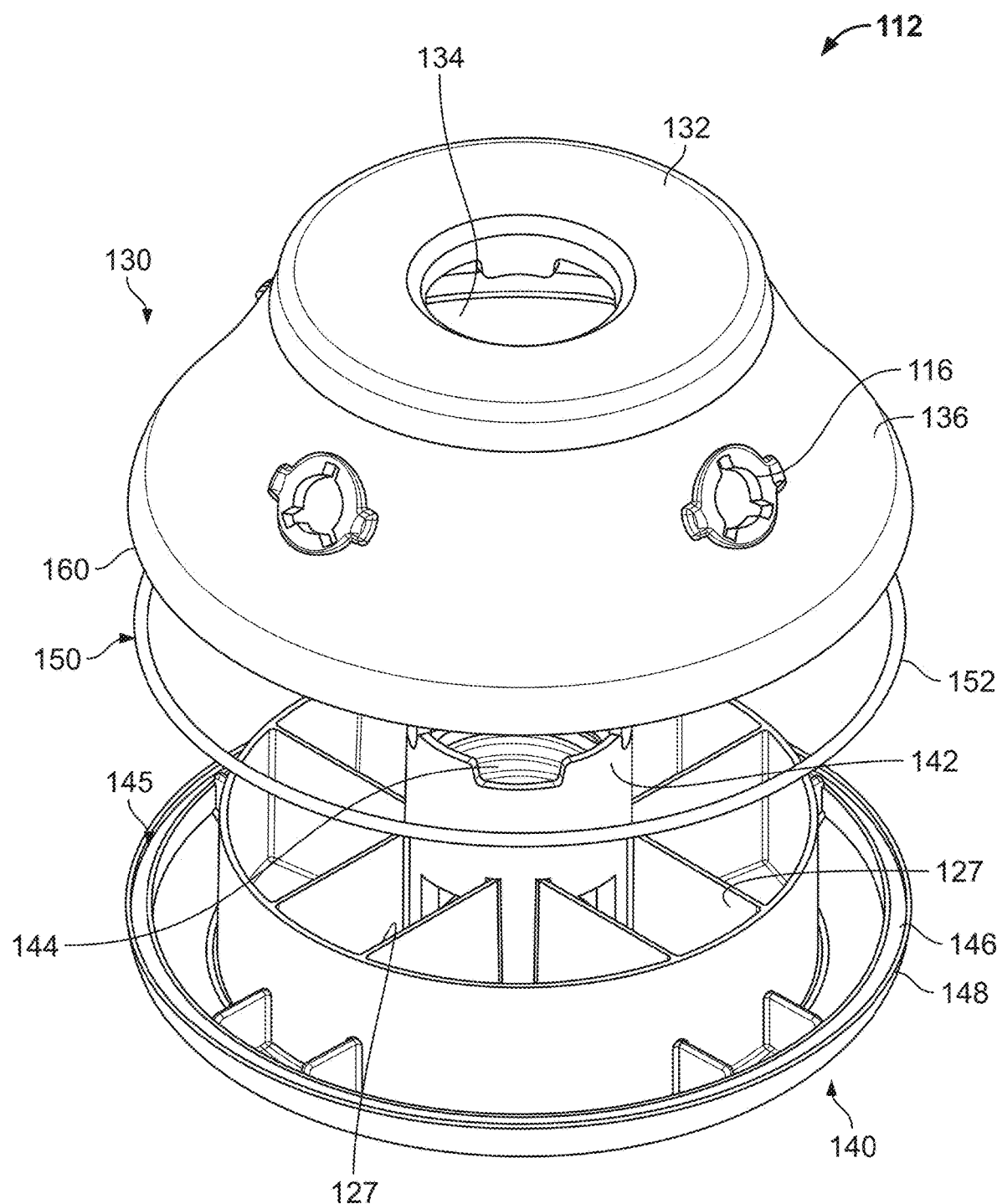
FIG. 5 is an exploded perspective view of the base assembly of the lower feeder shown in FIG. 4.

FIG. 5 is an exploded view of the base assembly 112 of the lower feeder 100 shown in FIG. 4. As shown in FIG. 3, the lower end of the nectar container 114 has a generally planar lower surface 120 from which a bottleneck extension 122 having a liquid flow opening 123 projects. The upper end of the nectar container 114 has external threads 124 for engagement with internal threads in the cap 118. While the lower feeder 100 illustrated in FIGS. 1-4 is a bottom fill feeder, having a nectar container in which the upper end is closed, the sealing base assembly according to the present invention could also be adapted for use with various top-fill hummingbird feeder designs.

Figure 6:
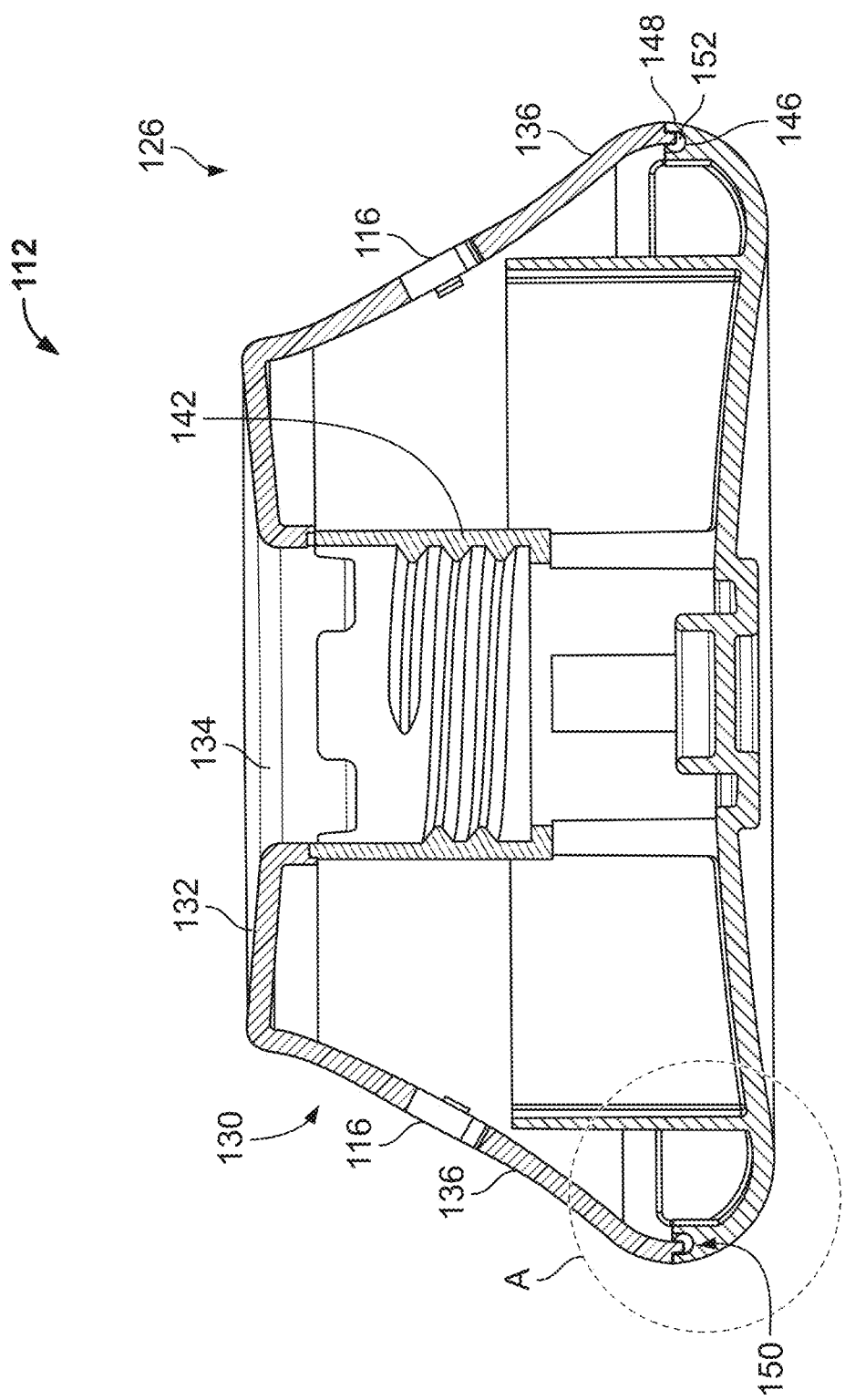
FIG. 6 is sectional side view of the base assembly shown in FIG. 5 as assembled.

The base assembly 112, shown in isolation and as assembled in FIG. 6, includes a two-part nectar basin, generally designated by reference numeral 126, having an upper part generally designated by reference numeral 130 and a lower part generally designated by reference numeral 140. The base assembly 112 further includes a recessed elastomeric sealing member generally designated by reference numeral 150 that is positioned to interface between the upper and lower parts 130, 140 of the nectar basin 126 when the feeder is assembled. The base assembly also includes an attaching member such as a collar 142 for removably coupling the base assembly to the nectar container as will be discussed further herein.

The upper part 130 of the nectar basin 126 includes a generally planar upper surface 132 with a top opening 134, and side surfaces 136 having the feed ports 116 therein. The feed ports 116 are preferably provided with ornamental features such as simulated flowers 38 (see FIGS. 1-3) which are adapted to attract and allow access to long-beaked hummingbirds while simultaneously preventing access by bees.

As shown in FIGS. 5 and 6, the lower part 140 of the nectar basin 126 includes an attaching member embodied as an upwardly extending cylindrical collar 142 with internal threads 144 that engage with external threads 121 on the bottleneck extension 122 on the lower end of the nectar container 114 when the bottleneck extension 122 is received within the collar 142 to secure the container 114 to the base assembly 112 as shown in FIG. 3. While the collar 142 in the embodiment shown is integrally molded to be part of the nectar basin lower part 140, other attaching members that are captured or otherwise held within the nectar basin, without being integral therewith, are also envisioned within the scope of the present invention. The lower part 140 may be provided with nectar channels 127 that are aligned with the feed ports 116 when the feeder is assembled.

Figure 7:
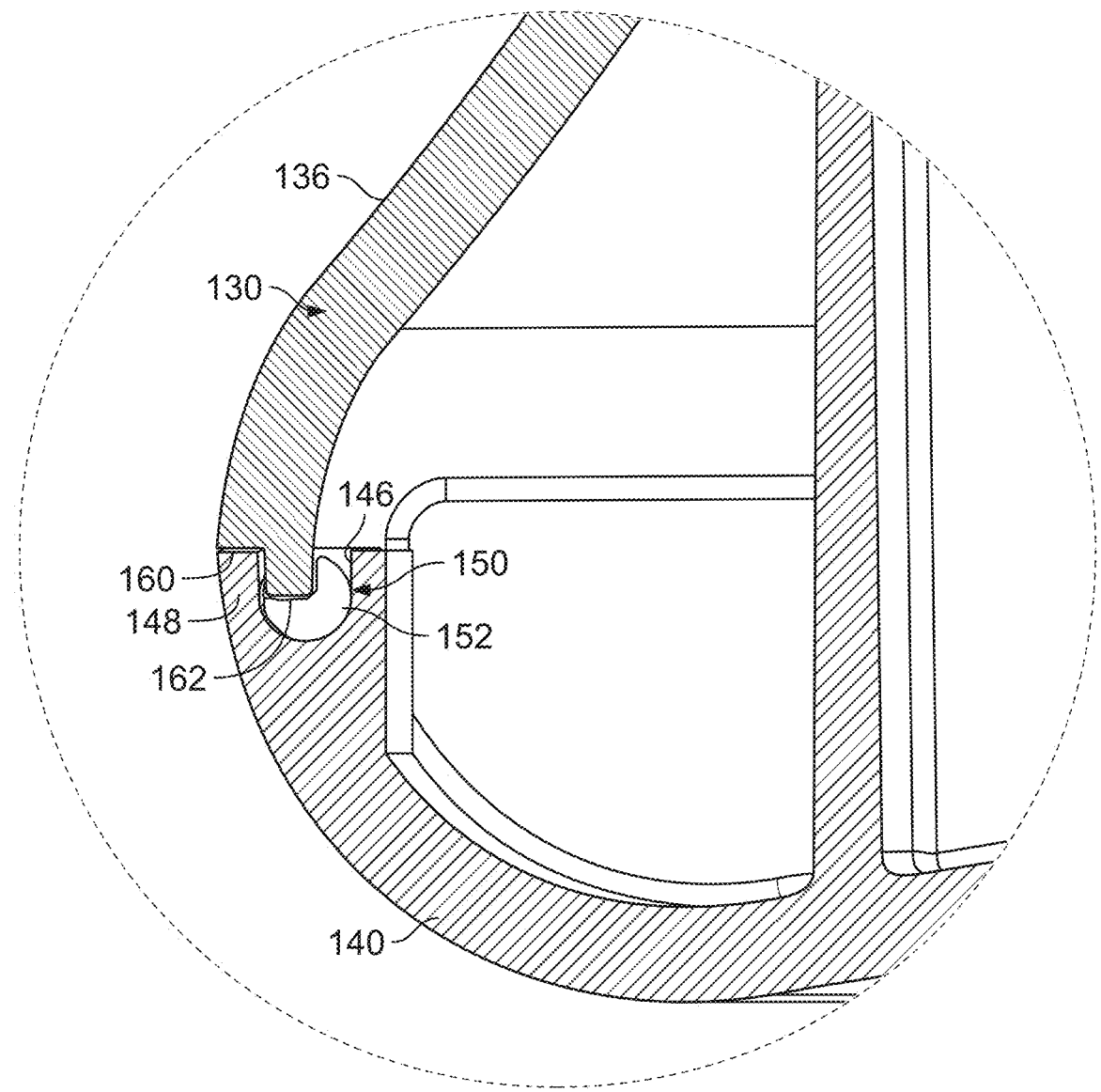
FIG. 7 is an enlarged view of Detail A of FIG. 6.
Figure 8:
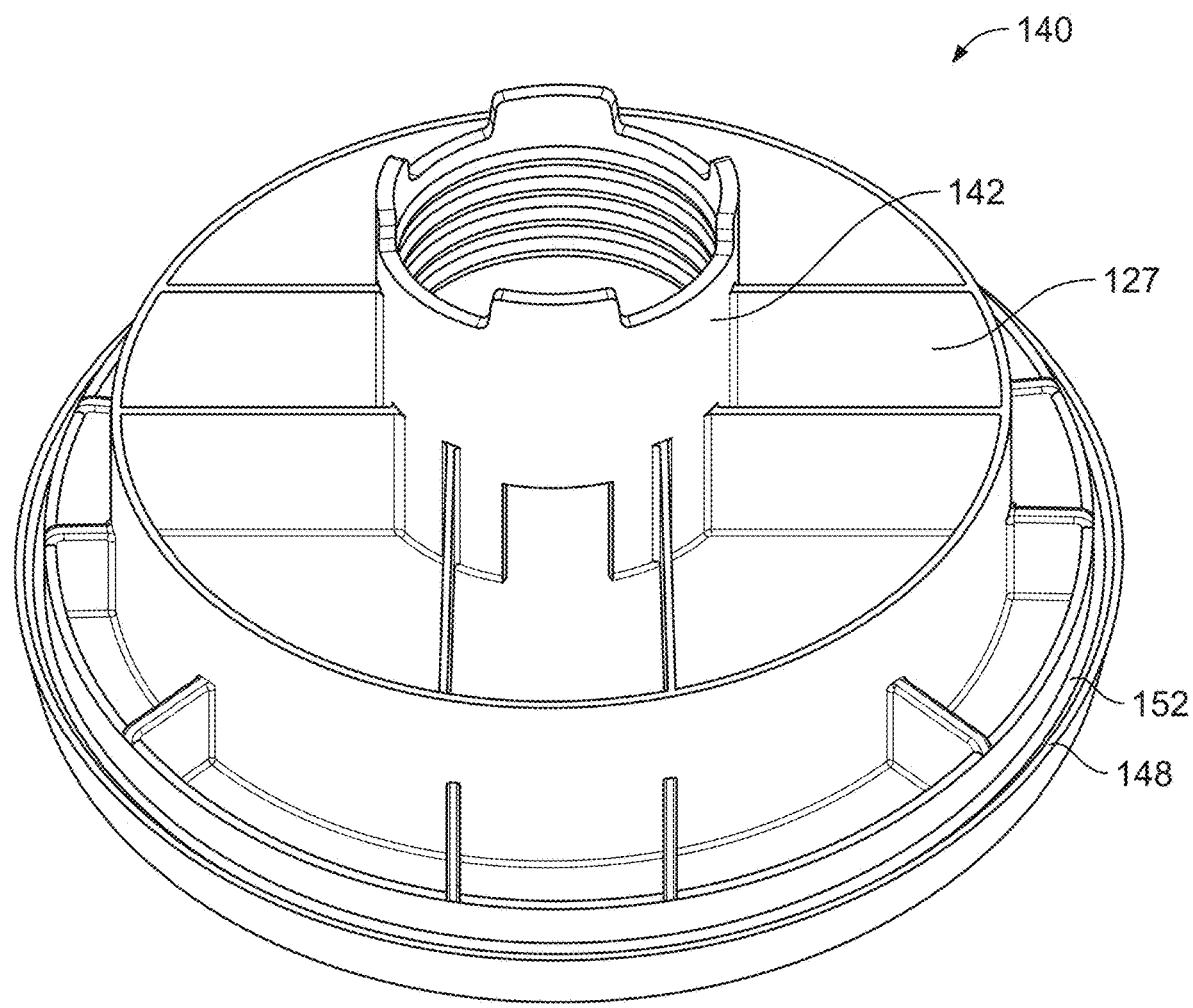
FIG. 8 is a perspective view of the upper side of the lower part of the base assembly shown in FIG. 4, with the recessed sealing member embodied as an O ring positioned within the groove retaining structure.

The lower part 140 of the nectar basin includes a retaining structure generally designated by reference numeral 145. In the embodiment shown in FIGS. 4-8, the retaining structure includes a groove 146 that is provided adjacent an outer edge 148 of the lower part 140. The recessed elastomeric sealing member 150, which may be embodied as an elastomeric O-ring 152, is received within the groove 146 as shown in FIGS. 6-8. The O-ring 152 may be retained through frictional engagement within the groove. Additionally or alternatively, the O-ring can be secured within the groove using an adhesive. However, it is preferable that the O-ring be removable, such as by a deliberate action on the part of the user, as may be considered desirable for cleaning or replacement.

The upper part 130 of the nectar basin has a lower edge 160 that is brought into abutment with the outer edge 148 of the lower part 140 when base is assembled. As shown in FIGS. 6 and 7, the upper part 130 also has a tongue 162 adjacent the lower edge 160. The tongue 162 extends into the groove 146 to compress the O-ring 152 which is retained in the groove and provide a mating seal edge with the sealing member O-ring.

To assemble the lower feeder, the upper part 130 of the nectar basin 126 is placed on top of the lower part 140 with the O-ring 152 positioned in the groove 146. The bottleneck extension 122 on the lower end of the nectar container 114 is inserted through the top opening 134 of the upper part 130 and the threads 121 thereon are engaged with the internal threads 144 in the collar 142 of the lower part 140 by rotating the nectar container 114 and base assembly 112 in opposing directions relative to one another. As the container 114 is screwed into the collar, the planar lower surface 120 of the container is brought into abutment with the planar upper surface 132 of the upper part 130 of the nectar basin 126. When the container is tightened within the collar, the container applies downward pressure to the upper surface 132 to force the upper part 130 of the nectar basin 126, and particularly the tongue 162, into sealing engagement with the sealing member 150, i.e., O-ring 152, in the lower part 140 to create a liquid-tight seal for the nectar basin. As a result, the feeder is resistant to spillage or leakage provided the feeder is not turned upside down. In addition, the recessed position of the O-ring sealing member 152 as held within the retaining structure groove 146 keeps the sealing member in place when the upper and lower parts 130, 140 are pulled apart. This protects the sealing member and makes for a more intuitive assembly by the user as only the two base parts need to be manipulated while the O-ring remains nested within the groove 146.

Figure 9:
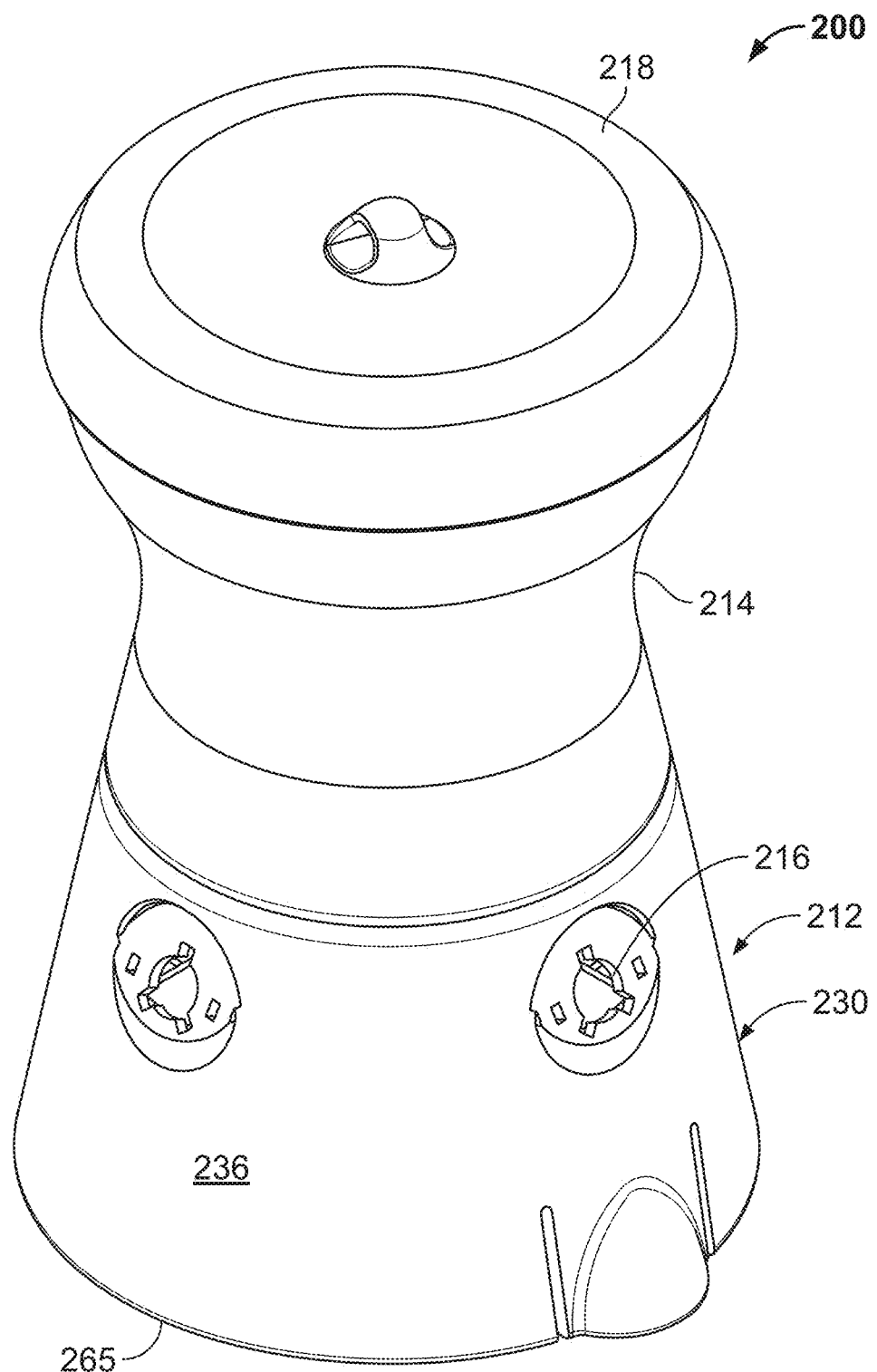
FIG. 9 is a perspective view of the upper feeder shown in FIG. 1 without the flower assemblies.
Figure 10:
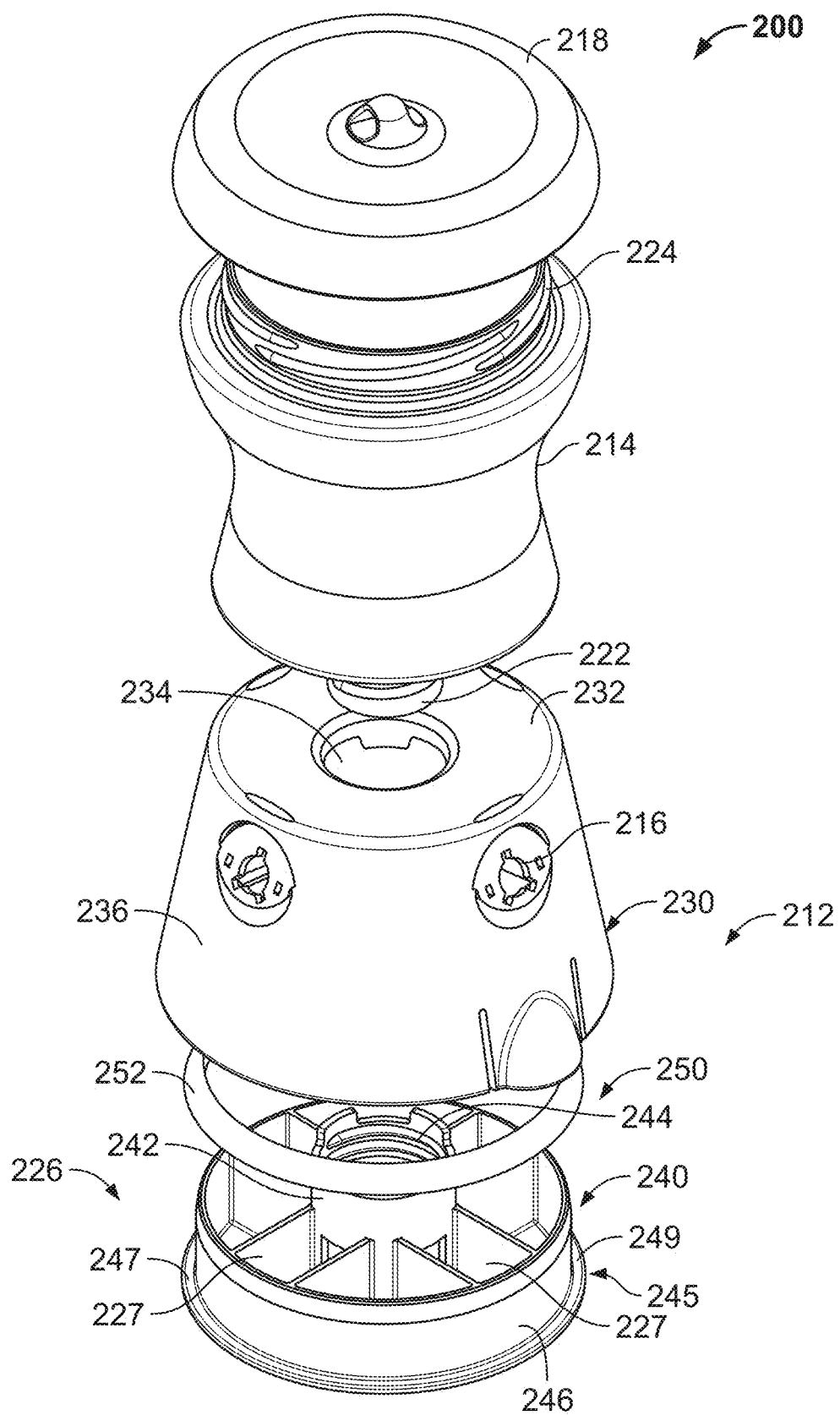
FIG. 10 an exploded perspective view of the upper feeder shown in FIG. 9.
Figure 11:
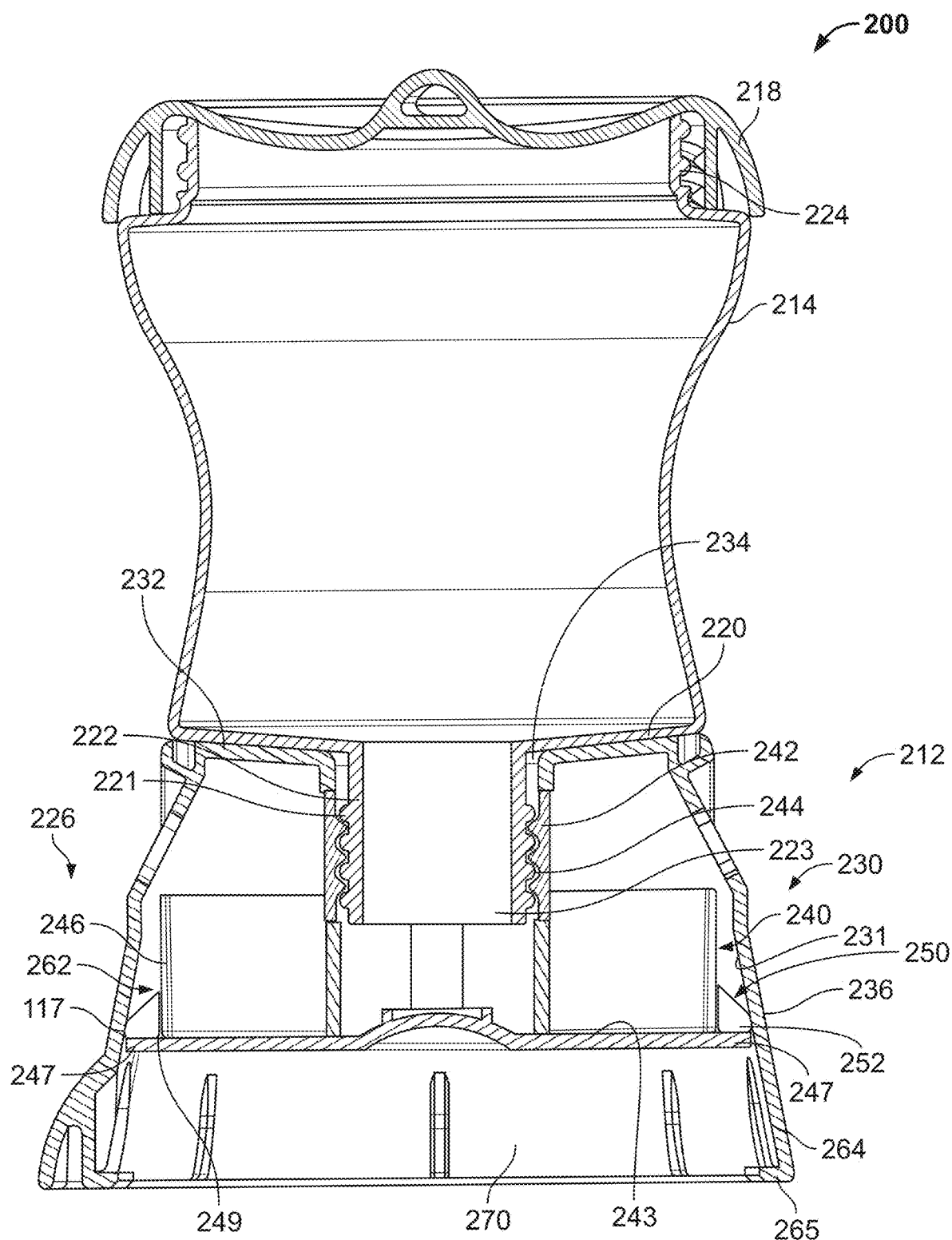
FIG. 11 is a side cross sectional view of the assembled upper feeder shown in FIG. 9.

The upper feeder 200, shown in FIGS. 9-11, includes a recessed elastomeric sealing member generally designated by reference numeral 250 (see FIGS. 10 and 11) in accordance with a second embodiment of the present invention. And, in like manner to the structure and operation described in connection with the lower feeder 100, the upper feeder 200 includes a base assembly generally designated by reference numeral 212 and a nectar container 214 positioned above the base assembly 212. The nectar container 214 holds a supply of nectar that is gravity fed into the base assembly 212 as birds draw nectar from the feeder through the feeder ports 216 in the base assembly as is known in the art. The upper feeder is configured to be suspended from a cap 218 which is attached to the upper end of the nectar container 214. Flower assemblies 38 (see FIGS. 1-3) have been omitted in FIGS. 9-11 as not being necessary to the present description.

FIG. 10 is an exploded view of the upper feeder 200 shown in FIG. 9. As can be seen in FIG. 11, the lower end of the nectar container 214 has a generally planar lower surface 220 from which a bottleneck extension 222 having a liquid flow opening 223 projects. The upper end of the nectar container 214 has external threads 224 for engagement with internal threads in the cap 218.

The base assembly 212, shown in cross section as assembled in FIG. 11, includes a two-part nectar basin, generally designated by reference numeral 226, having an upper or outer part generally designated by reference numeral 230 and a lower or inner part generally designated by reference numeral 240. The recessed elastomeric sealing member 250 is positioned to interface between the upper and lower parts 230, 240 of the nectar basin 226 which are nested when the feeder is assembled. The base assembly 212 also includes an attaching member such as a collar 242 for removably coupling the base assembly 212 to the nectar container 214.

The upper part 230 of the nectar basin 226 includes a generally planar upper surface 232 with a top opening 234, and a side wall 236 having the feed ports 216 therein. The feed ports 216 are preferably provided with ornamental features such as simulated flowers 38 (see FIGS. 1-3) which are adapted to attract and allow access to long-beaked hummingbirds while simultaneously preventing access by bees.

As shown in FIGS. 10 and 11, the lower part 240 of the nectar basin 226 includes an attaching member embodied as an upwardly extending cylindrical collar 242 with internal threads 244 that engage with external threads 221 on the bottleneck extension 222 on the lower end of the nectar container 214 when the bottleneck extension 222 is received within the collar 242 to secure the container 214 to the base assembly 212 as shown in FIG. 11. While the collar 242 in the embodiment shown is integrally molded to the lower part floor 243 to be part of the nectar basin lower part 240, other attaching members that are captured or otherwise held within the nectar basin, without being integral therewith, are also envisioned within the scope of the present invention. The lower part 240 may be provided with nectar channels 227 that are aligned with the feed ports 216 when the feeder is assembled.

The lower part 240 of the nectar basin 226 includes a retaining structure generally designated by reference numeral 245. In the embodiment shown in FIGS. 9-11, the retaining structure includes a perimeter wall 246 on the lower part 240 of the nectar basin. The perimeter wall 246 has a lower flange 247, which may be formed by an outer edge of the floor 243, that forms a shelf 249 for supporting the recessed sealing member 250. The sealing member 250 is an annular member 252 that is in elastic contact with the perimeter wall 246 and pressed into abutment with the shelf 249 when the upper and lower parts 230, 240 of the nectar basin are brought together during assembly. The sealing member 250 may be an elastomeric O-ring or, as shown in FIGS. 10 and 11, the annular member 252 may have a triangular cross section that nests within and is retained against the shelf 249 and the wall 246.

The side wall 236 of the nectar basin is semi-conical and defines a hollow, downwardly opening, cupped receptacle generally designated by reference numeral 262 having a lower skirt 264 with an increasing inner diameter toward the lower edge 265 thereof (see FIG. 11). To assemble the upper feeder, the lower part 240 of the basin is inserted within the receptacle 262 to bring the outer edge 117 of the annular member 252, which is supported on the flange 247 and nested in the shelf 249, into abutment with the inner surface 231 of the side wall 236 above the skirt 264. The bottleneck extension 222 on the lower end of the nectar container 214 is inserted through the top opening 234 of the upper part 230 and the threads 221 thereon are engaged with the internal threads 244 in the collar 242 of the lower part 240 by rotating the nectar container 214 and base assembly 212 in opposing directions relative to one another.

As the container 214 is screwed into the collar 242, the planar lower surface 220 of the container 214 is brought into abutment with the planar upper surface 232 of the upper part 230 of the nectar basin 226. When the container is tightened within the collar, the container applies downward pressure to the upper surface 232 to force the upper part 230 of the nectar basin 226 into sealing engagement with the sealing member 250, which is retained against the shelf 249 on the lower part 240 with the outer edge 117 thereof in contact with the side wall inner surface 231, to create a liquid-tight seal for the nectar basin 226. If the lower feeder 100 is to be joined with the upper feeder 200 for use as the combination feeder 10, the widened skirt 264 then provides a recess 270 for receiving the upper end of the lower feeder 100 which is secured therein.

When the upper feeder 200 is to be disassembled by unscrewing the container 214 to allow the lower part 240 of the basin 226 to drop down out of the receptacle 262 through the widened skirt 264, the recessed position of the annular sealing member 252 as nested in the shelf 249, along with the release of frictional contact of the sealing member against the inner surface 231 of the side wall 236 as the lower part 240 is removed through the widened skirt, and the elastomeric contact between the annular sealing member 252 and the perimeter wall 246, keeps the sealing member mounted on the basin lower part when the upper and lower parts 230, 240 are separated. Retaining the sealing member on the shelf 249 and against the perimeter wall 246 protects the sealing member and, as with the first embodiment, makes for a more intuitive assembly by the user as only the two base parts 230, 240 need to be manipulated while the sealing member remains engaged with the retaining structure 245 as embodied by the perimeter wall 246 and the shelf 249. However, as with the first embodiment, the sealing member may be further secured, such as by using an adhesive, although this is not preferred.

While the nectar container and base assembly have been described herein as having mating planar surfaces that are brought into a pressing engagement when the container is tightened into the base assembly, other shapes for the container and base assembly are also envisioned. For example, the lower end of the container and the upper surface of the base assembly may include complementary curved shapes that allow for relative rotation while being brought into a frictional or near frictional engagement as the feeder assembly is tightened together. Alternatively, other structures for applying force against the upper part of the basin to effect sealing engagement with the basin lower part may be used such as a threaded engagement between the upper and lower parts.

While the retaining structures have been described herein as being on the lower part of the feeding basin, it will be understood that comparable structures may be formed on the upper part of the feeding basin. For example, a groove may be formed in the perimeter of the upper part while the lower part has an abutting edge and tongue configuration. Accordingly, the present invention is intended to include any recessed sealing member that is retained against one of the upper or lower parts of the feeding basin when the basin is disassembled.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A hummingbird feeder comprising:
   a nectar container having a lower end with a liquid flow opening;
   a nectar basin positioned below the nectar container and removably coupled thereto, said nectar basin including an upper part and a lower part that are separable from one another and configured to be engaged along abutting surfaces thereof when the feeder is assembled, the upper part of the nectar basin includes a lower skirt including a linearly tapering sidewall defining a receptacle having a diameter increasing in a direction toward a lower end edge thereof, the lower skirt extending below all portions of the basin lower part when the feeder is assembled such that the lower part is received entirely within the receptacle, an outer diameter of the lower skirt increasing continuously in the direction toward, and to, the lower end edge;
   a recessed elastomeric sealing member directly engaged with a retaining structure defined on the basin lower part and an inner surface of the tapering sidewall of the upper part of the nectar basin to create a liquid tight seal of the nectar basin when the feeder is assembled, the retaining structure includes a perimeter wall having a bottom flange that defines a shelf, said sealing member being engaged with the shelf and against the upper part when the feeder is assembled, the sealing member is an annular member having a first and second face oriented normally to one another and engaging a respective one of the perimeter wall and the bottom flange, and a linearly inclining face engaging with the inner surface of the linearly tapering sidewall of the upper part; and a plurality of nectar channels defined by and in the basin lower part and aligned with a respective one of a plurality of feed ports defined in the basin upper part.

2. The hummingbird feeder as set forth in claim 1, wherein the retaining structure includes a groove formed adjacent an outer edge of the lower part, said sealing member being fitted within said groove.

3. The hummingbird feeder as set forth in claim 2, wherein said sealing member is an O-ring.

4. The hummingbird feeder as set forth in claim 1, further comprising an attaching member associated with said nectar basin and configured to attach the nectar basin to the nectar container when the feeder is assembled, the lower end of the nectar container including an abutting lower surface and the upper part of the nectar basin having an abutting upper surface, the recessed elastomeric sealing member being squeezed between said upper and lower parts to seal the nectar basin when the abutting lower surface of the nectar container is brought into engagement with the abutting upper surface of the upper part of the nectar basin as the nectar container is secured to the attaching member to assemble the feeder.

5. The hummingbird feeder as set forth in claim 4, wherein the attaching member is an upwardly extending cylindrical collar secured to the nectar basin lower part, said nectar container lower end including a bottleneck extension that is received within the collar with a threaded engagement, tightening of the bottleneck extension into the collar causing said container abutting lower surface to apply force to said nectar basin upper part abutting upper surface.

6. The hummingbird feeder as set forth in claim 1, wherein the lower part of the nectar basin is nested within the basin upper part when the feeder is assembled.

7. The hummingbird feeder as set forth in claim 6, wherein the lower skirt creates a recess for receiving a second hummingbird feeder that is coupled thereto to form a combination hummingbird feeder.

8. The hummingbird feeder as set forth in claim 7, wherein the second hummingbird feeder includes a second nectar container and a second nectar basin positioned below the second nectar container and removably coupled thereto, said second nectar basin including an upper part and a lower part that are separable from one another and configured to be engaged along adjacent surfaces thereof when the second hummingbird feeder is assembled, said second hummingbird feeder including a recessed elastomeric sealing member engaged within a groove formed adjacent an outer edge of the lower part of the second nectar basin to seal said second nectar basin when the second feeder is assembled.

9. The hummingbird feeder as set forth in claim 8, wherein said sealing member of said second feeder is an O-ring.

10. The hummingbird feeder as set forth in claim 9, wherein the adjacent surfaces include an upper edge on said lower part and a lower edge on said upper part, said upper part further including a tongue that extends at least partly into said groove to press against said O-ring when the feeder is assembled, the tongue is formed inside of the lower edge of the upper part, and the upper and lower edges abut adjacent an outer side of the tongue.

11. The hummingbird feeder as set forth in claim 10, wherein the tongue extends downwardly from the upper part and into the groove.

12. The hummingbird feeder as set forth in claim 11, wherein in an assembled state, the outer side of the tongue is directly adjacent an inner side of the lower edge defining the groove, and at least a portion of the O-ring is arranged between an inner side of the tongue and a side of the groove opposite the inner side of the lower edge.

13. The hummingbird feeder as set forth in claim 1, wherein the shelf extends between the perimeter wall and the lower skirt, and the sealing member is arranged on the upper surface of the shelf and abuts against the perimeter wall and an interior wall of the lower skirt when the feeder is assembled.

14. The hummingbird feeder as set forth in claim 1, wherein each nectar channel of the plurality of nectar channels is defined by a pair of vertically extending walls.

15. The hummingbird feeder as set forth in claim 1, wherein the lower end edge of the lower skirt extends radially inward to define an annular and inwardly extending lip.

16. The hummingbird feeder as set forth in claim 10, wherein the lower part includes a continuous perimeter side wall defining the upper edge, the groove formed into the upper edge and defined between opposing surfaces of the continuous perimeter wall, the groove formed adjacent an outer edge of the lower part.

17. A hummingbird feeder comprising:
a nectar container having a lower end with a liquid flow opening;
a nectar basin positioned below the nectar container and removably coupled thereto, the nectar basin including an upper part and a lower part that are separable from one another and configured to be engaged along an upper edge of the lower part and a lower edge of the upper part when the feeder is assembled, the upper part further including a tongue formed inside of the lower edge of the upper part and extending downwardly, the upper and lower edges abutting adjacent an outer side of the tongue, the lower part including a continuous perimeter wall defining the upper edge, a groove formed into the upper edge and defined between opposing outward and inward facing surfaces of the continuous perimeter wall, the groove formed adjacent an outer edge of the lower part, the upper part and the lower part of the nectar basin contact one another in a direction of assembly only along the upper edge of the lower part and the lower edge of the upper part; and
a recessed elastomeric sealing member fitted within the groove and positioned between the upper and lower parts of the nectar basin, the tongue extending into the groove to press against the sealing member to create a liquid tight seal of the nectar basin when the feeder is assembled, in an assembled state, a free end of the tongue having a planar surface abutting the sealing member in the downward direction, the outer side of the tongue is positioned directly adjacent an inner side of the lower edge defining the groove, and at least a portion of the sealing member is arranged between an inner side of the tongue and the outward facing surface of the groove opposite the inner side of the lower edge.

18. The hummingbird feeder as set forth in claim 17, wherein the groove formed adjacent an outer edge of the lower part and defines a bottom surface having a semi-circular cross-section between the opposing outward and inward facing surfaces of the continuous perimeter wall.

19. The hummingbird feeder as set forth in claim 17, wherein the elastomeric sealing member defines a cross-section including a semi-circular portion abutting the semi-circular bottom surface of the groove.

* * * * *